(No Model.)  3 Sheets—Sheet 1.
T. P. MILLIGAN.
ELECTRICAL DEVICE FOR TOWING VEHICLES.
No. 518,673. Patented Apr. 24, 1894.
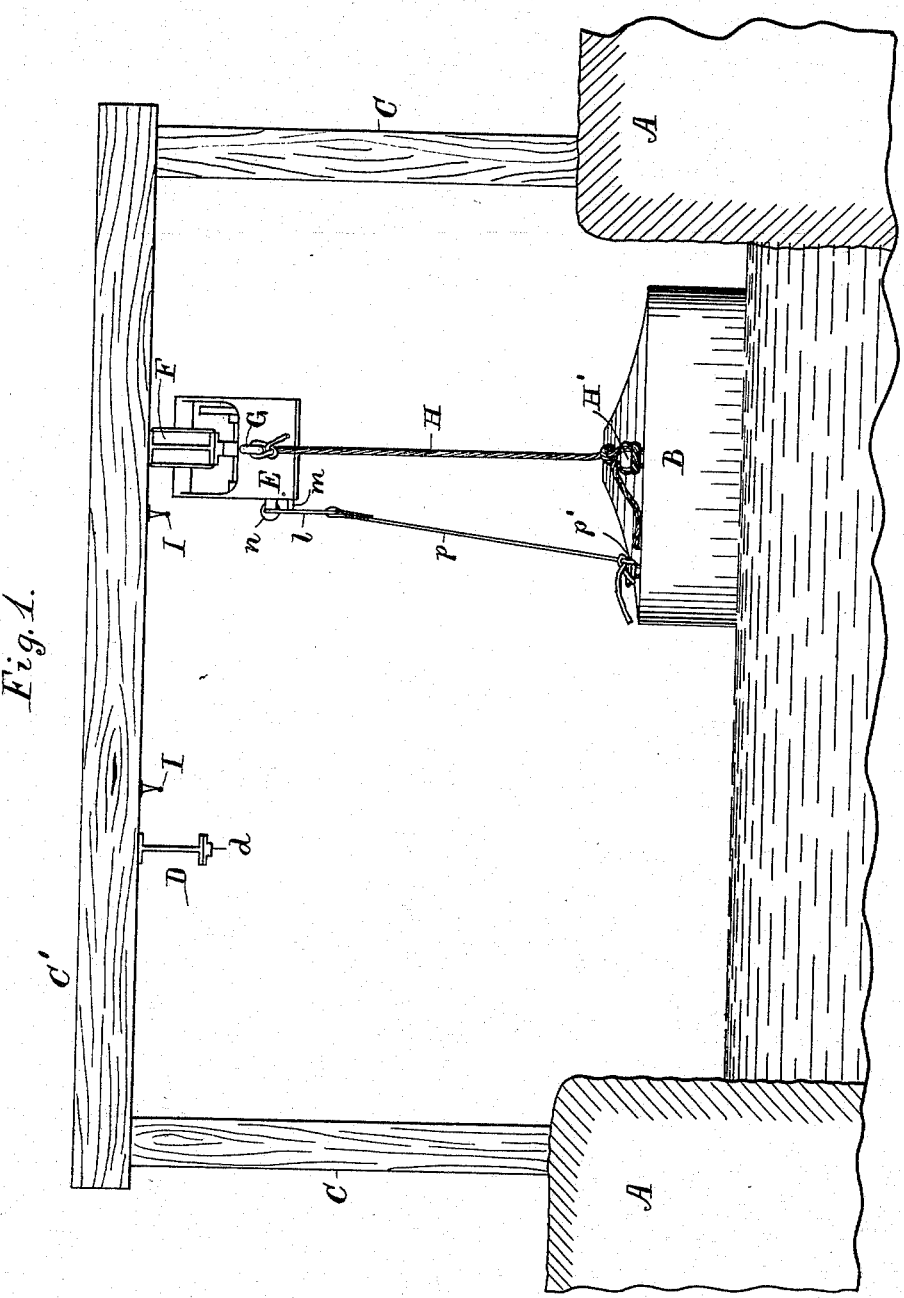
Attest:
L. Lee,
Thomas S. Crane.
Inventor.
Thomas P. Milligan

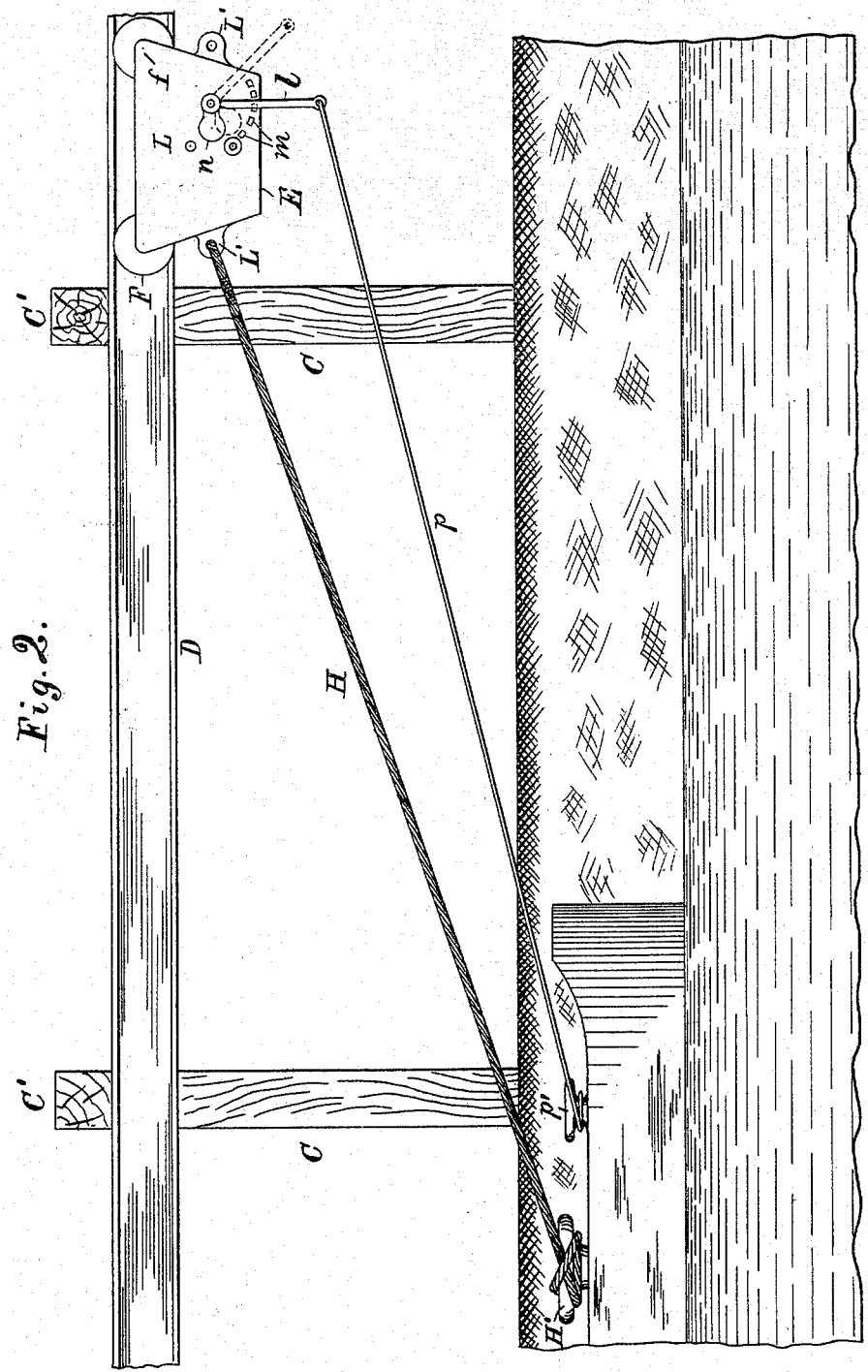

(No Model.) 3 Sheets—Sheet 3.
T. P. MILLIGAN.
ELECTRICAL DEVICE FOR TOWING VEHICLES.
No. 518,673. Patented Apr. 24, 1894.
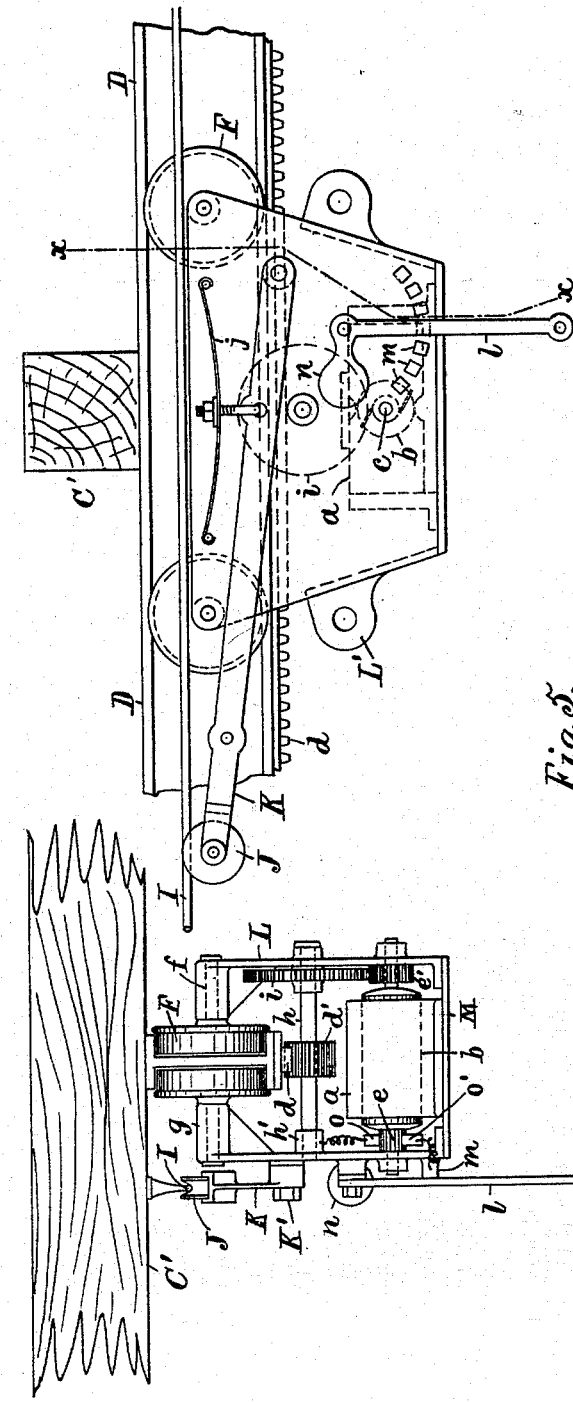
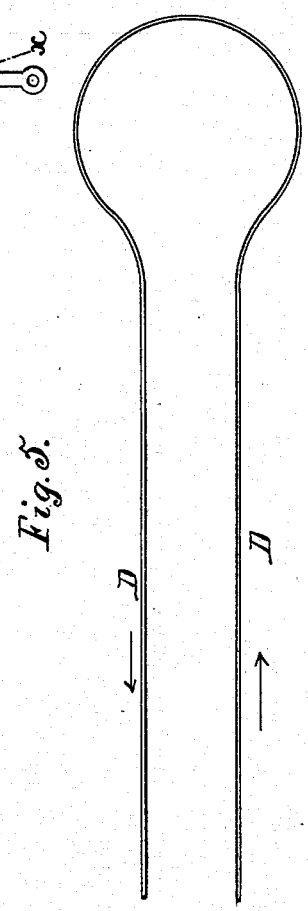
Attest:
L. Lee.
Thomas S. Crane.
Inventor.
Thomas P. Milligan
THE NATIONAL LITHOGRAPHING COMPANY,
WASHINGTON, D. C.

UNITED STATES PATENT OFFICE.

THOMAS P. MILLIGAN, OF SOUTH ORANGE, NEW JERSEY.

ELECTRICAL DEVICE FOR TOWING VEHICLES.

SPECIFICATION forming part of Letters Patent No. 518,673, dated April 24, 1894.

Application filed June 3, 1893. Serial No. 476,471. (No model.)

*To all whom it may concern:*

Be it known that I, THOMAS P. MILLIGAN, a citizen of the United States, residing at South Orange, Essex county, New Jersey, have invented certain new and useful Improvements in Electrical Devices for Towing Vehicles, fully described and represented in the following specification and the accompanying drawings, forming a part of the same.

The object of this invention is to furnish the means of towing canal boats or other vehicles by electric power without furnishing such vehicles themselves with an electric motor or electrical connections.

The invention consists in a rail fixed adjacent to the path of the vehicle, a carriage mounted upon the rail with a suitable wheel for gearing it thereto, an electric motor for driving such wheel, an electric conductor parallel with the rail, a trolley and suitable connections for leading the electricity from the conductor to the motor, and a coupling or drag rope attached to the carriage for connection with the canal boat or other vehicle. Two rails are preferably used to support carriages moving in opposite directions, and the rails are preferably arranged over the path of the vehicle so that the drag rope may hang down from the carriage.

In applying this invention to a canal, the flexibility of the drag ropes would permit the boats to move from side to side of the canal under the guidance of the rudder, and to thus approach either bank, or to pass one another with great facility.

The invention also includes a means for automatically breaking the circuit to the motor when the tension upon the drag rope is relaxed, and means for exciting such tension before the carriage is set in motion.

In the annexed drawings, the invention is shown applied to a canal and canal boat, but the same device may, with suitable modification, be applied to propel other vehicles.

In the drawings, Figure 1 is a cross section of a canal, and Fig. 2 is a side elevation of a canal, with my improvements applied thereto. Fig. 3 is an end view of the carriage, in section on line $x$, $x$, in Fig. 4, with the rail and the girder supporting the same. Fig. 4 is a side elevation of the same parts. Fig. 5 is a plan of the rail at end of route.

A designates the banks of the canal, B the canal boat, C posts upon the canal banks, and C' girders across the tops of the same.

D designates the two rails secured upon the under side of the girders parallel with the banks of the canal. The rails are shown made of I-beams with lateral flanges at the top and bottom, and a longitudinal rack $d$ secured upon the under side of the rail.

E designates the carriage suspended beneath the rail and supported by wheels F fitted between the flanges of the I-beam.

G designates lugs or ears upon the carriage to which the drag rope H may be attached.

I designates the electrical conductor supported upon the girders C' at a suitable distance from the side of the carriage, and J is the trolley wheel pressed upon the conductor by a spring arm K pivoted to the carriage.

In Figs. 3 and 4, the carriage is shown with side plates L and bottom plate M, the latter supporting the electric motor, and the former containing the bearings for the rotating parts. The axles $f$ for the wheels F are fitted movably to the bearings $g$ at the top of the plates, and a shaft $h$ is extended across the carriage below the rack $d$ and fitted to bearings $h$ upon the side plates. The shaft is provided with a pinion $d'$ meshing with the rack and with a cog-wheel $i$ adjacent to one of the plates.

The motor is shown with field magnets $a$, armature $b$, and armature spindle $c$, the latter being furnished at one end with commutator $e$ and at the other end with a cog-wheel $e'$ meshing with the wheel $i$ upon the pinion shaft.

The trolley arm K is pressed normally upward by a spring $j$ and is insulated from the carriage upon its pivot K', and connected electrically with an insulated switch lever $l$, mounted upon the plate L adjacent to a series of contact studs $m$. The lever is held normally out of contact with the studs by means of a weight $n$. Such weight resists the motion of the switch lever, but permits the lever to be brought successively into contact with the studs when the lever is shifted by its pull rope $p$. The studs are connected electrically through a series of resistances, with one of the contact brushes $o$ upon the commutator of the motor, thus connecting the motor with the conductor I when the lever is shifted over the studs. The opposite brush o' is connected electrically with the carriage, and thus with the rail D, which serves for a return conductor. The lower arm of the lever l is provided with a pull rope p, and the latter is shown in Fig. 2 extended to a cleat upon the canal boat.

The drag rope H in Fig. 2 is shown attached to a cleat H' upon the bow of the canal boat. By the weight n the lever l is automatically disconnected from the contacts and thus serves to cut off the current from the motor, and prevent the carriage from moving voluntarily. A continuous pull of sufficient force upon the rope p is therefore required to maintain an electrical connection between the motor and the main conductor I. In operating with such construction, the drag rope is first secured to the canal boat, the rope being made of suitable length to pull as nearly horizontally as possible, although the wheels F are adapted to resist any downward strain upon the carriage. The rope p being extended to the canal boat necessarily takes the same nearly horizontal position, and is thus adapted to pull the lever sidewise and thus produce contact with the studs m. The rope p is then pulled by hand to start the carriage until the drag rope H is tightened. In pulling the rope, the switch lever is shifted gradually over the studs m, so that the current is brought gradually upon the motor, and the lever may be allowed to stand upon any stud when the desired speed is attained. The nature and operation of such resistances are already well known, and they are not therefore shown in in the drawings. The rope p is then secured upon the cleat with the desired tension. The carriage then operates to pull the boat in the desired manner, and as the carriage and boat preserve the same relation, it is obvious that the pull upon the rope p is maintained to secure the operation of the motor. The motion of the carriage may be stopped at any time by relaxing the pull rope, and thus permit the lever l to take its normal position, and the carriage may thereafter be started again by pulling upon the rope as before. With this construction, the carriage is wholly prevented from accidental movement, and its motion is placed completely under the control of any person upon the vehicle.

The rail D bearing the carriage may be fixed in any convenient manner and in any desired position parallel with the path of the carriage; but I prefer to arrange the rail as shown in Fig. 1, as it thus suspends the drag rope and prevents the same from entanglement with adjacent objects.

The form of the carriage and the gearing and electrical connections thereon, may be varied without departing from my invention, as the essential part of my construction is the combination with the fixed rail, of a carriage movable thereon and carrying an electric motor and gearing to move it along the rail with sufficient power to drag an attached vehicle.

In operating the invention in connection with a canal, the rails d would be extended along each level section of the canal, and the boat would necessarily be disconnected from the carriage when a lock was reached, and at such point the two rails would be connected by loop D', as shown in Fig. 5, so that the carriage could be transferred from one to the other. This would bring the ear L' at the rear of the carriage, and the switch lever l in a proper relation to the pull rope p, so that the carriage would be adapted to travel over the rail to the opposite end of the canal section. Such opposite end being reached, the carriage would then be transferred by a similar loop to the opposite rail, and the carriage would thus be used continuously for hauling boats in opposite directions. Means for reversing the current through an electric motor are already well known, and may, if desired, be applied to the carriage and actuated by a switch and pull-rope, or other suitable means.

A switch is shown connected with a switch lever l for automatically breaking the circuit through the motor, but it is obvious that any other means, as a suitable spring, may be used to disengage the lever from the stud or studs which complete the circuit.

What I claim as my invention is—

1. In an electrical device for towing vehicles, the combination, with a fixed rail, of a carriage sustaining an electric motor and geared to the rail, a coupling or drag rope attached to the carriage, a switch lever for directing the electric current to the motor, and a pull rope for actuating such switch lever, substantially as set forth.

2. In an electrical device for towing vehicles, the combination, with a fixed rail, of a carriage sustaining an electric motor and geared to the rail, a coupling or drag rope attached to the carriage, a switch lever with means for automatically breaking the circuit through the motor, and a pull rope for shifting the switch lever when desired, substantially as herein set forth.

3. In an electrical device for towing vehicles, the combination, with a fixed rail, of a carriage sustaining an electric motor and geared to the rail, a coupling or drag rope attached to the carriage, a switch lever and contacts arranged to automatically break the circuit through the motor, a weight or spring for resisting the motion of the switch lever, and a pull rope for shifting the lever when required, as herein set forth.

4. In an electrical device for towing vehicles, the combination, with a fixed rail, of a carriage sustaining an electric motor and geared to the same, a coupling or drag rope attached to the carriage, an electric conductor parallel with the rail, a trolley wheel with spring arm pivoted upon the carriage to make contact with such conductor, a switch with lever for leading the current from the trolley to the motor, and a pull rope for actuating such lever, substantially as set forth.

5. In an electrical device for towing vehicles, the combination, with a rail having laterally projecting flanges upon opposite sides of a carriage having wheels fitted between such flanges, a rack upon one edge of the rail, a pinion fitted to such rack, an electric motor geared to the same, a coupling or drag rope attached to the carriage, a switch with lever for directing the current through the motor, and a pull rope for actuating such lever, as herein set forth.

6. In an electrical device for towing vehicles, the combination, with a rail having laterally projecting flanges upon opposite sides of a carriage having wheels fitted between such flanges, a rack upon one edge of the rail, a pinion fitted to such rack, an electric motor geared to the same, an ear upon the end of the carriage to attach a coupling or drag rope, an electric conductor parallel with the rail, a trolley wheel with spring arm pivoted upon the carriage, a switch with lever for leading the current from the trolley to the motor, and contacts for automatically breaking the circuit through the motor, and a pull rope for actuating such switch lever, substantially as herein set forth.

In testimony whereof I have hereunto set my hand in the presence of two subscribing witnesses.

THOMAS P. MILLIGAN.

Witnesses:
T. S. CRANE,
L. LEE.